JOHN WADEMAN, WILLIAM WADEMAN, TOM WADEMAN, AND WALTER WADEMAN.
DOFFING MECHANISM FOR SPINNING, TWISTING, AND THE LIKE MACHINES.
APPLICATION FILED MAR. 11, 1922.
1,432,646.
Patented Oct. 17, 1922.
5 SHEETS—SHEET 1.
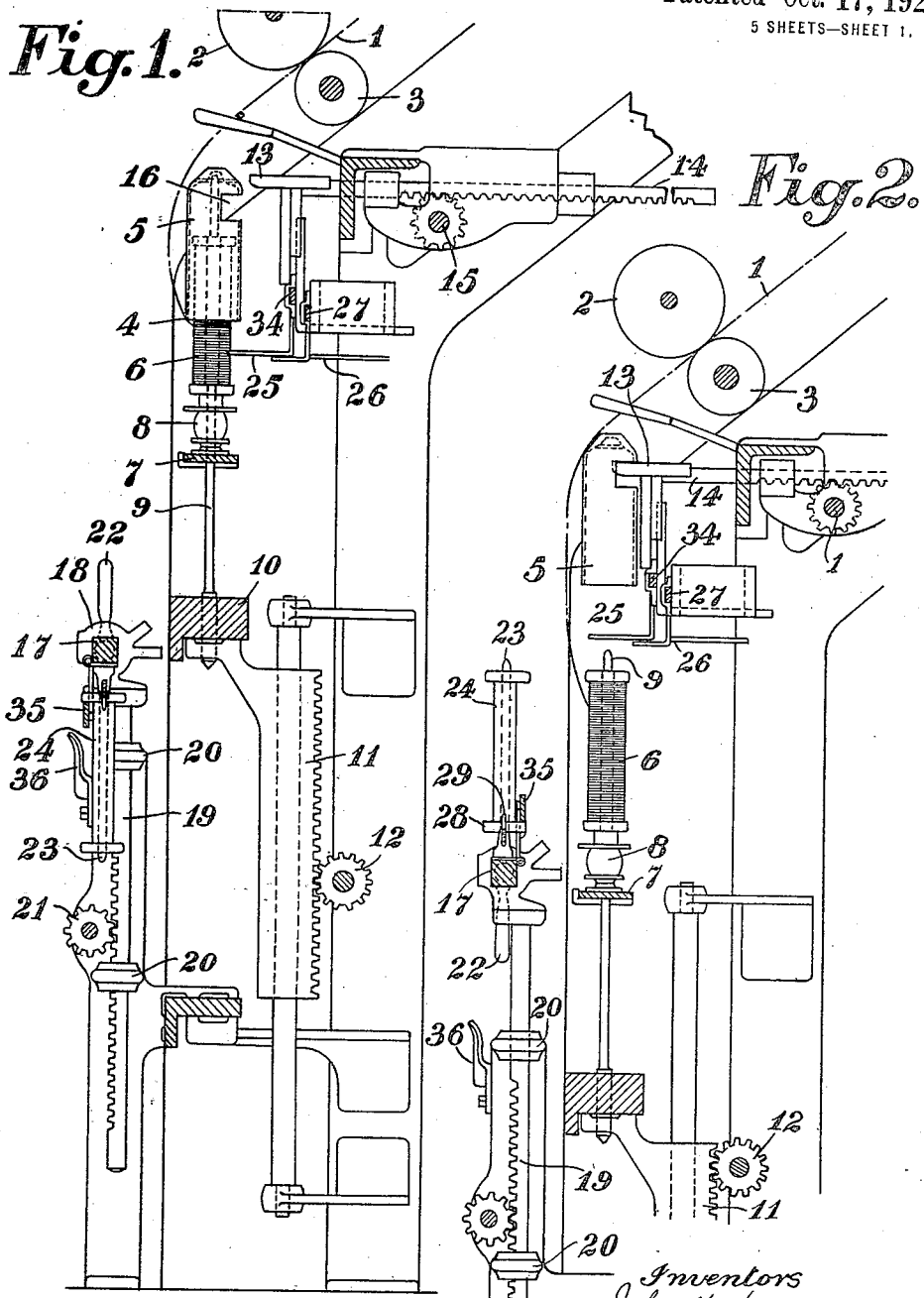

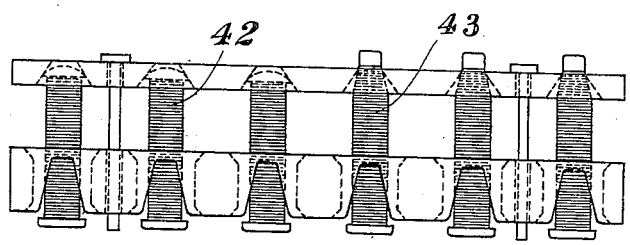
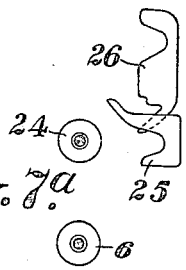
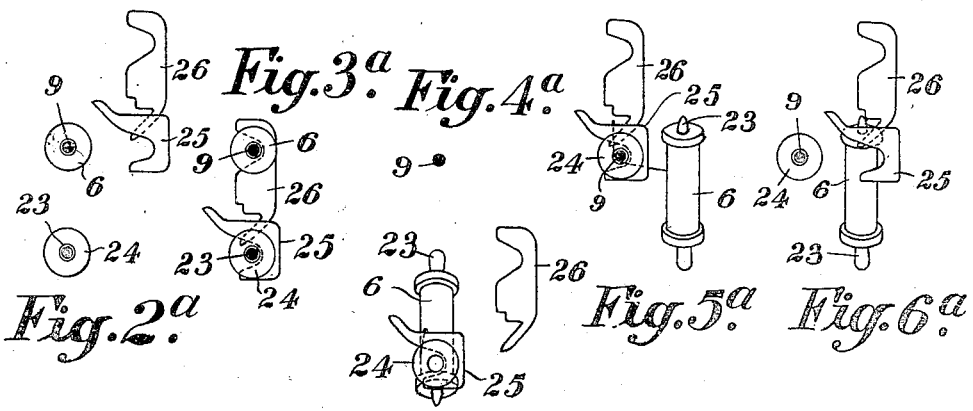

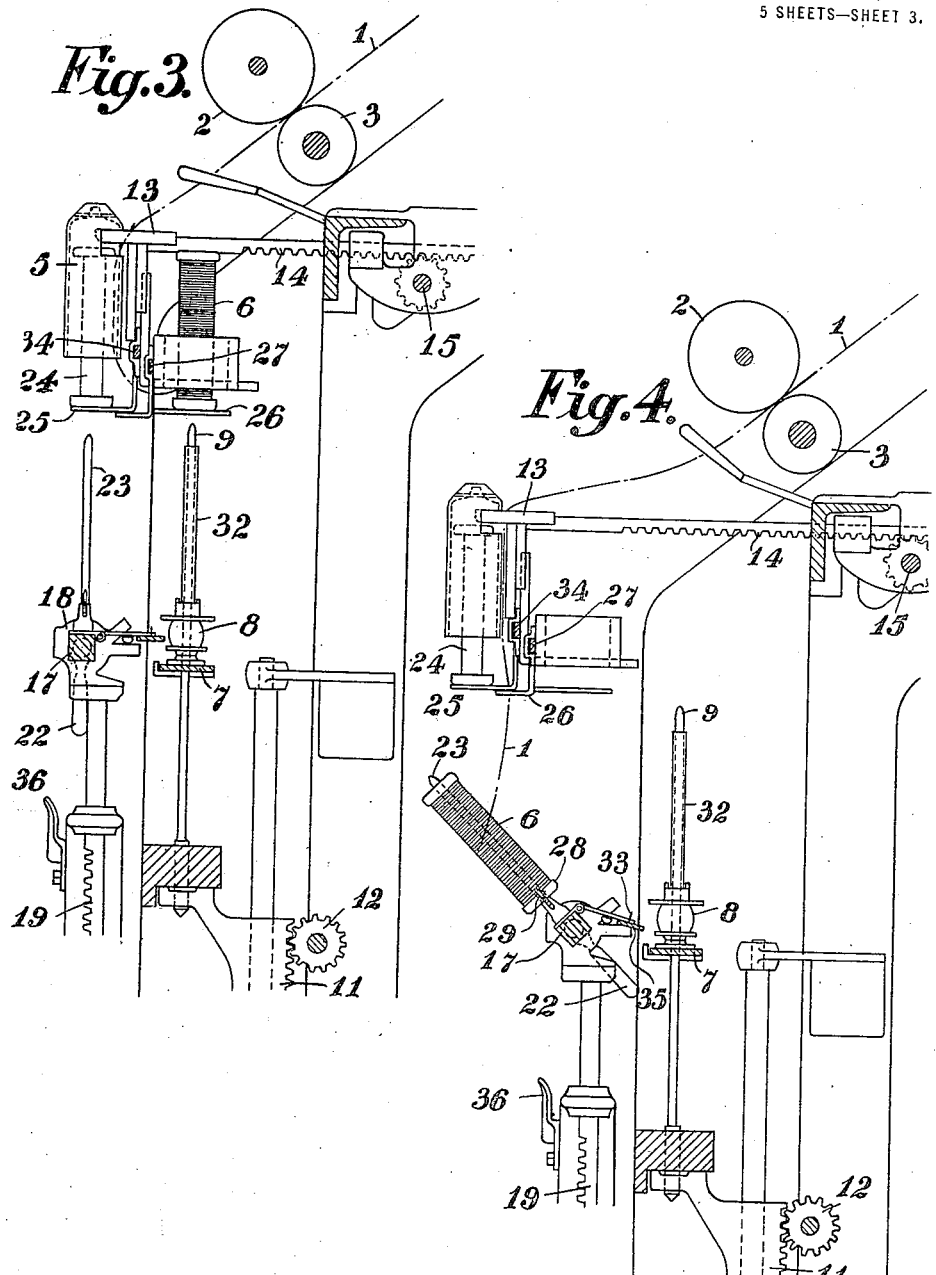

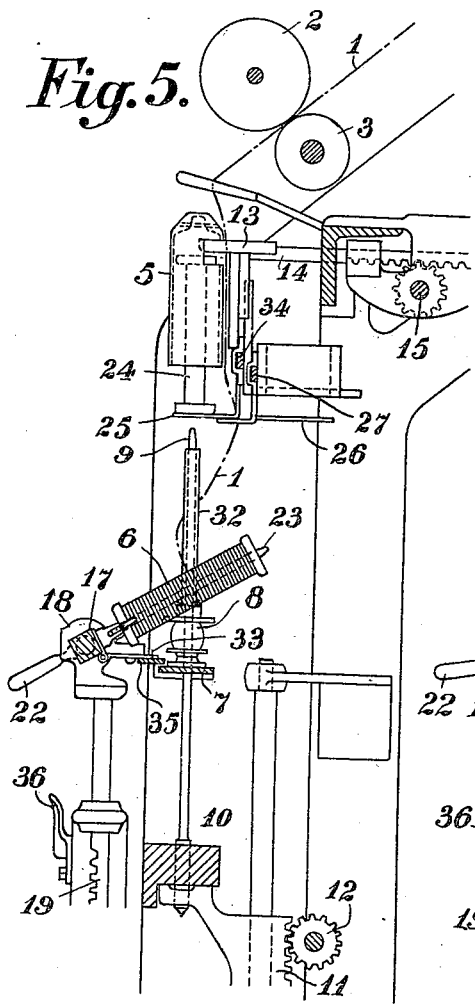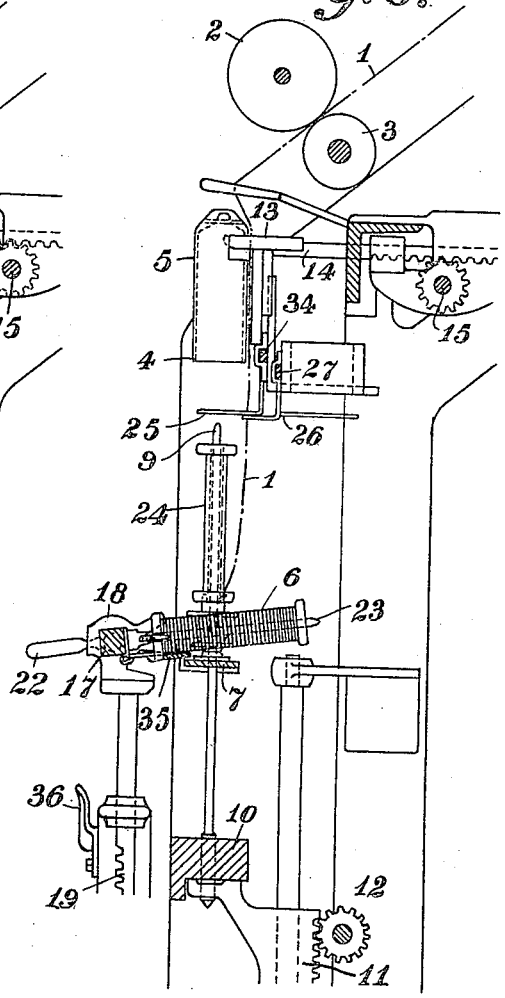

JOHN WADEMAN, WILLIAM WADEMAN, TOM WADEMAN, AND WALTER WADEMAN.
DOFFING MECHANISM FOR SPINNING, TWISTING, AND THE LIKE MACHINES.
APPLICATION FILED MAR. 11, 1922.
1,432,646.
Patented Oct. 17, 1922.
5 SHEETS—SHEET 5.
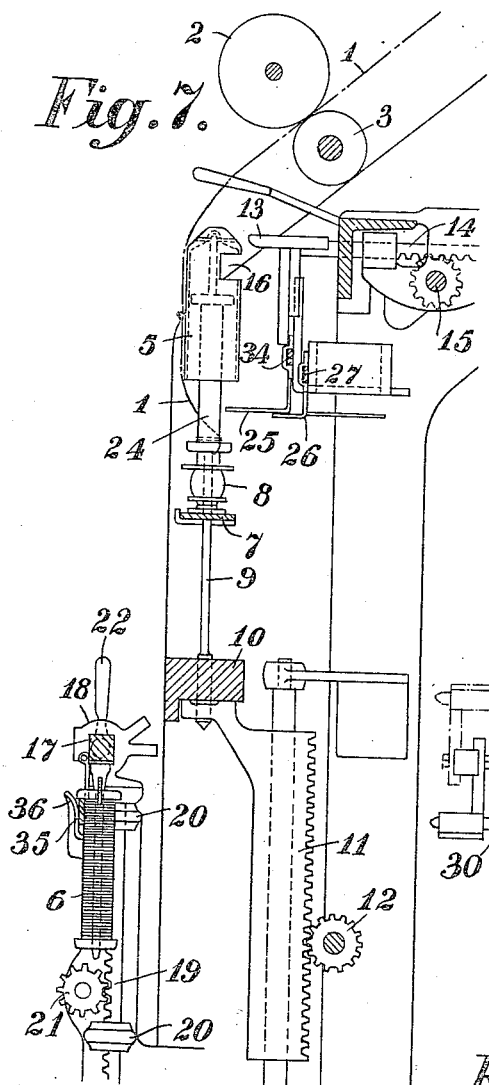
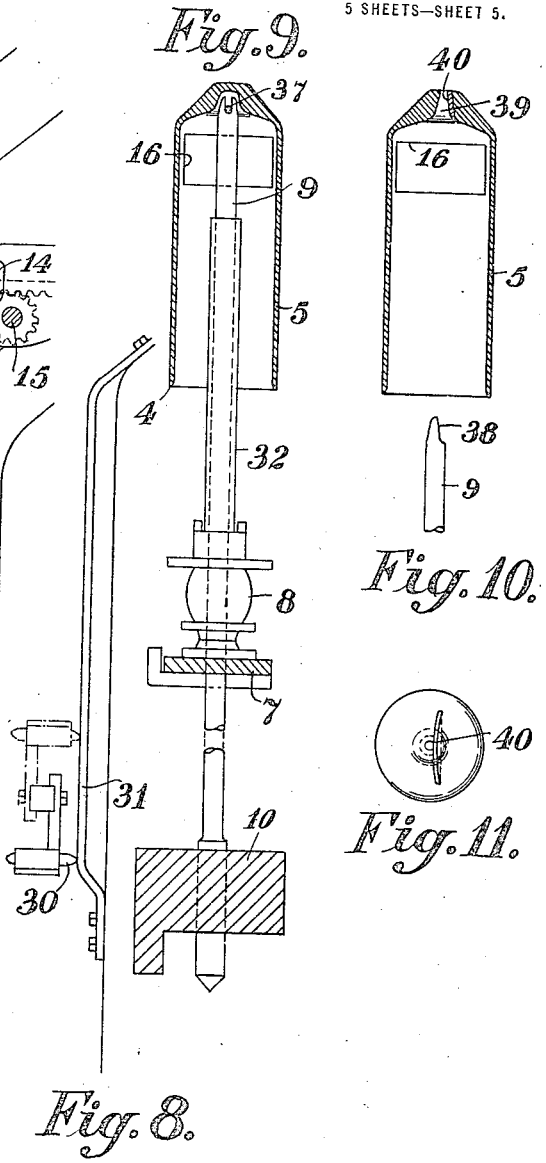

Patented Oct. 17, 1922.

1,432,646

UNITED STATES PATENT OFFICE.

JOHN WADEMAN, WILLIAM WADEMAN, TOM WADEMAN, AND WALTER WADEMAN, OF KEIGHLEY, ENGLAND.

DOFFING MECHANISM FOR SPINNING, TWISTING, AND THE LIKE MACHINES.

Application filed March 11, 1922. Serial No. 543,072.

*To all whom it may concern:*

Be it known that we, JOHN WADEMAN, WILLIAM WADEMAN, TOM WADEMAN, and WALTER WADEMAN, all subjects of the King of Great Britain, residing in Keighley, in the county of York and Kingdom of England, have invented certain new and useful Improvements in Doffing Mechanism for Spinning, Twisting, and the like Machines, of which the following is a specification.

The present invention relates to improvements in spinning, twisting, slubbing, roving and the like machines, more particularly of the cap type.

According to the present invention, means are provided to raise the caps into the range of a retaining device whereupon the rail for the full bobbins is dropped and will be subsequently raised by a hinged flap on a lifting rail for the reception of the full and empty bobbins respectively. This lifting rail in rising conveys an empty bobbin into a cap which has been displaced in an axial line with it and will in its motion at the same time raise the bobbin on the spinning spindles so that spindle retaining devices moving in a plane at right angles to the motion of the said rail and pass under the flanges of the full and empty bobbins respectively and hold these in position.

The full and empty bobbins are then displaced further outwards relatively to the spinning frame and the full bobbins allowed to drop on to the said lifting rail. The end from the said full bobbin being caught from a catch on its temporary support to lie across the path of the wharle spindle so that directly the full bobbin is received by the rail and locked thereon from rotation, rotation of the wharle will cause the engaging of the end upon it and the automatic covering of the end from the full bobbin, the severed end being then engaged between the wharle and the flange of the empty bobbin which is dropped on to the spinning spindle subsequent to the receding of the cap.

This invention is more particularly described with reference to the accompanying drawings in which:—

Figure 1 is a diagrammatic side elevation of a spinning frame to which the invention is applied showing the parts in one position, Figures 2, 3, 4, 5, 6 and 7 are corresponding views showing parts in subsequent positions.

Figures 2ª, 3ª, 4ª, 5ª, 6ª and 7ª are various plan views showing the relative positions of the holders with full and empty bobbins when the other parts of the machine are in the positions shown in Figures 2 to 7 respectively.

Figure 8 is a detail showing a locking device,

Figure 9 is a sectional elevation on an enlarged scale of the spindle,

Figure 10 shows a cap and spindle in a modified form of construction,

Figure 11 is a corresponding plan view to Figure 10.

Figure 12 is a bobbin carrier.

The fibre end 1 being spun passes through drawing rollers 2, 3, and under the lower edge 4, of the cap 5, of peculiar form to be spun on to a bobbin 6, carried on a rail 7, driven by wharle 8 in usual manner. The bobbin is guided by a spindle 9 mounted on a rail 10. According to the present invention this rail 10 is displaceable vertically up and down by a rack and pinion gear 11, 12. The pinion 12 can be rotated by hand or by power at predetermined times as desired. When it is desired to doff the full bobbins from the spindle the retaining device consisting of a slide 13 mounted on a rock 14, to be operated from a pinion on a shaft 15 is slid forward to engage the end or cut away part 16 of the cap 5. The shaft 15 can be operated by hand or power and if desired its operation may be automatically coordinated with the operation of the pinion 12. The cap can thus be supported in the position shown in Fig. 2, whilst the spindle 9 is dropped down into the position shown in this figure to bring the bobbin 6 clear of the cap 5. Meanwhile the bobbin reserve holder is operated from the position shown in Figure 1 to that shown in Figure 2. This reserve holder comprises a squared shaft 17 mounted in a support 18, mounted on a rack bar 19, moving in guides 20, on the spinning frame, which rack bar 19 is operated by a pinion 21 either worked by hand or power or automatically operating in co-ordinated relationship with the operation of the shafts 12 and 15. As the spindle 9 is therefore lowered into the position shown in Figure 2 the rack bar 19 is slightly raised. The shaft 17 is then rotated by means of hand grip 22 or again automatically to swing the spindle 23 carrying the spare empty bobbin 24 into the operative position when it will lie adjacent to the full bobbin 6. The slide 13 is then displaced further outwards from the spinning frame into the position shown in Figure 3 until the cap 5 lies axially above the reserve spindle 23. The spindle 23 and wharle 8 are then simultaneously moved upwards until the bobbin 24 lies within the cap 5. In this position the holders 25, 26 for the empty and full bobbins respectively are slid sideways, that is to say laterally across the frame until they come under the bobbins 24 and 6 respectively as will be seen from Figure 3ª.

The spindles 23, wharle 8ª and tube 32 are then again dropped by means of the rack bar 19 until the parts take up the position shown in Figure 3. The slide 13 which supports the holders 25 and 26 is then slid still further away from the frame of the machine until the full bobbin 6 lies over the spindle 23.

The rack 19 is then raised until the full bobbin is taken up on the spindle 23, whereupon the holder 26 is displaced laterally on its guide rail 27, independently of the holder 25. Now when the spindle 23 will be lowered by means of the rack bar it will take with it the full bobbin 6, the lower flange 28 of which will be engaged by a spring catch 29 to prevent unpredetermined release of the full bobbin from the spindle 23. This catch is however not essential to the operation of the device.

The squared shaft 17 is then rotated by means of a handle 22 or otherwise into the position shown in Figure 4. It will be preferred to provide some locking device for this shaft. This can be obtained by means of a stop such as 30 (Figure 8) engaging with a rail 31, disengagement being provided by moving the handle 22 slightly sideways or laterally until the stop 30 comes out of engagement with the stop rail 31.

The parts are then in the position suitable for hatching, that is to say, connection of the spun end to the empty bobbin. The shaft 17 is turned to the position shown in Figure 5 so that the end 1 lies in the path of the driving tube 32 on the spindle 9. The slide 13 is then slid back into the position shown in Figure 5, whereupon the holder 25 is slid on to its guide rail 34 laterally to free this from the bobbin 23 as shown in Figures 5ª, 6ª. The empty bobbin 24 then falls on to the driving tube 32 and comes securely into engagement with it whilst the end 1 will be locked between the bottom flange of the bobbin 24 and the wharle. The shaft 17 will be meanwhile turned to the position shown in Figure 4 in which the full bobbin 6 engages with a pin 33 which prevents it from rotating on the spindle 23. Consequently directly the wharle 8 commences to rotate the end will be severed between the full bobbin 4 and the fresh empty bobbin 24.

Spinning can now commence directly the bobbin 24 is brought into range of the spindle cap 4, which can then be released from the holder 13.

The raising and lowering of the cap relatively to the bobbin 24 and its supporting rail 7 taking place in usual manner, spinning will continue until the bobbin 24 is filled. This reciprocation can take place by means of the rack 11, 12, or by the usual means for the purpose of obtaining this traverse of the spun thread on the bobbin 24, the parts then coming into position shown in Figure 7 where spinning is proceeding. Full bobbins can then be doffed from the temporary carrier by turning the handle 22 into position shown in Figure 7 whereupon the shaft 17 is locked owing to the rail 35 carrying the stop pin for the bobbin 6 engaging with the hook bracket 36. When it is desired to remove the full bobbins 6 from their temporary spindles, it will obviously be necessary to raise the shaft 17 by means of rack and pinion gear 19 and 21 to free the bobbin 6 from the pin on the rail 35. (Any desired means may be provided for driving the cap 4 from the spindle 9.)

In the construction shown in Figure 9 the spindle is notched at its top end and engages with a pin 37 on the bobbin.

In the modified form of construction shown in Figure 10 a flat 38 is formed on the top of the spindle 9, whilst the perforation 39 in the top of the cap 4 has a saw cut placed across it in which a thin metal strip 40 is placed thus forming an abutment for the flat 38 on the spindle 9.

The bobbin carriers are shown in detail in Figure 12 from which it will be seen that the arrangement is shown suitable for doubled headed bobbins such as 42, and for the cop type of spool 43.

The hole in the cap has the further advantage that air pressure cannot be created within the cap during the spinning process which has a tendency to cause the fluffing of the fibre at the bottom end of the bobbin.

We declare that what we claim is:—

1. A doffing mechanism for textile spinning frames comprising in combination spindles to support bobbins during spinning, auxiliary spindles to support empty bobbins, means to raise and lower both of said spindles, engaging means to hold the spinning cap, holding means to simultaneously engage full and empty bobbins and means to displace said holding means forwards from the position in which both bobbins are above both spindles to a position in which the full bobbin is over the empty spindle and then rearwards from the said position until the empty bobbin is over the spinning spindle.

2. A doffing mechanism for textile spinning frames comprising in combination spindles to support bobbins during spinning, auxiliary spindles to support empty bobbins, means to rotate said auxiliary spindles by horizontal axis, means to raise and lower both of said spindles, engaging means to hold the spinning cap, holding means to simultaneously engage full and empty bobbins and means to displace said holding means forwards from the position in which both bobbins are above both spindles to a position in which the full bobbin is over the empty spindle and then rearwards from the said position until the empty bobbin is over the spinning spindle.

3. A doffing mechanism for textile spinning frames comprising in combination spindles to support bobbins during spinning, auxiliary spindles to support empty bobbins, means to rotate said auxiliary spindles by horizontal axis, means to raise and lower both of said spindles, engaging means to hold the spinning cap, holding means to simultaneously engage full and empty bobbins and means to displace said holding means forwards from the position in which both bobbins are above both spindles to a position in which the full bobbin is over the empty spindle and then rearwards from the said position until the empty bobbin is over the spinning spindle, and means to prevent the rotation of the full bobbins when on the rotating auxiliary supporting spindles.

In witness whereof, we have hereunto signed our names this 26th day of January, 1922, in the presence of two subscribing witnesses.

JOHN WADEMAN.
WILLIAM WADEMAN.
TOM WADEMAN.
WALTER WADEMAN.

Witnesses:
CLIFFORD ACRID,
WILFRID J. WHITAKER.